United States Patent
Taubman et al.

(10) Patent No.: US 6,546,143 B1
(45) Date of Patent: Apr. 8, 2003

(54) EFFICIENT WAVELET-BASED COMPRESSION OF LARGE IMAGES

(75) Inventors: David S. Taubman, Pymble (AU); Christos Chrysafis, Mountain View, CA (US); Erik Ordentlich, Palo Alto, CA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/267,246

(22) Filed: Mar. 12, 1999

(51) Int. Cl.[7] .............................. G06K 9/36; H04B 1/66
(52) U.S. Cl. ................................. 382/240; 375/240.19
(58) Field of Search ................................ 382/240, 243, 382/232, 248, 260, 263, 264, 266, 296, 305, 173; 375/240.11, 240.18, 240.19; 709/247; 345/418, 759, 781, 790

(56) References Cited

U.S. PATENT DOCUMENTS

| | | | | | |
|---|---|---|---|---|---|
| 4,943,855 | A | * | 7/1990 | Bheda et al. | 375/240.11 |
| 5,048,111 | A | * | 9/1991 | Jones et al. | 382/248 |
| 5,754,793 | A | * | 5/1998 | Eom et al. | 709/247 |
| 5,883,978 | A | * | 3/1999 | Ono | 382/248 |
| 5,926,791 | A | * | 7/1999 | Ogata et al. | 704/500 |
| 6,144,773 | A | * | 11/2000 | Kolarov et al. | 382/240 |
| 6,195,465 | B1 | * | 2/2001 | Zandi et al. | 382/248 |
| 6,229,927 | B1 | * | 5/2001 | Schwartz | 382/248 |
| 6,259,735 | B1 | * | 7/2001 | Aono et al. | 375/240.11 |
| 6,292,168 | B1 | * | 9/2001 | Venable et al. | 345/153 |
| 6,298,167 | B1 | * | 10/2001 | Martucci et al. | 382/248 |
| 6,356,665 | B1 | * | 3/2002 | Lie et al. | 382/240 |
| 6,381,280 | B1 | * | 4/2002 | Lynch et al. | 375/240.19 |

* cited by examiner

Primary Examiner—Bhavesh M. Mehta
Assistant Examiner—Kanji Patel

(57) ABSTRACT

A subband decomposition of an image is performed by filtering the image in a progression of N line windows. In a first filter stage, vertical filters perform high and low pass filtering on each N line window. Then horizontal filtering is performed on the output of each vertical filter. The lowest subband provided by the filter stage is recursively decomposed by additional filter stages. Higher subbands of each filter stage are encoded and placed in an embedded bitstream. Block encoding can be performed in which a number of lines of each subband are coded as a plurality of blocks. The blocks of a subband are coded independently of each other. The block coding supports region-of-interest reconstruction.

50 Claims, 11 Drawing Sheets

FIGURE 1
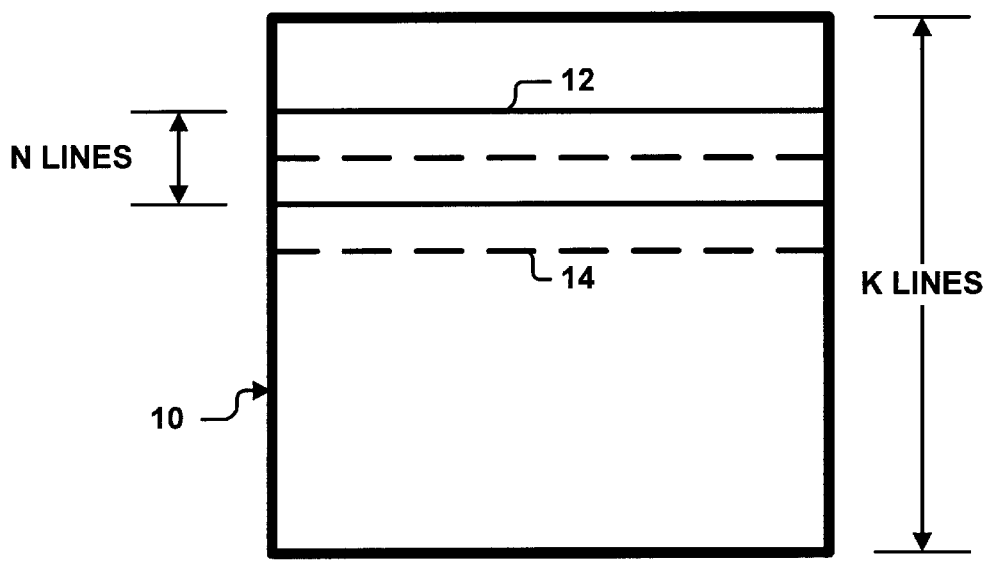
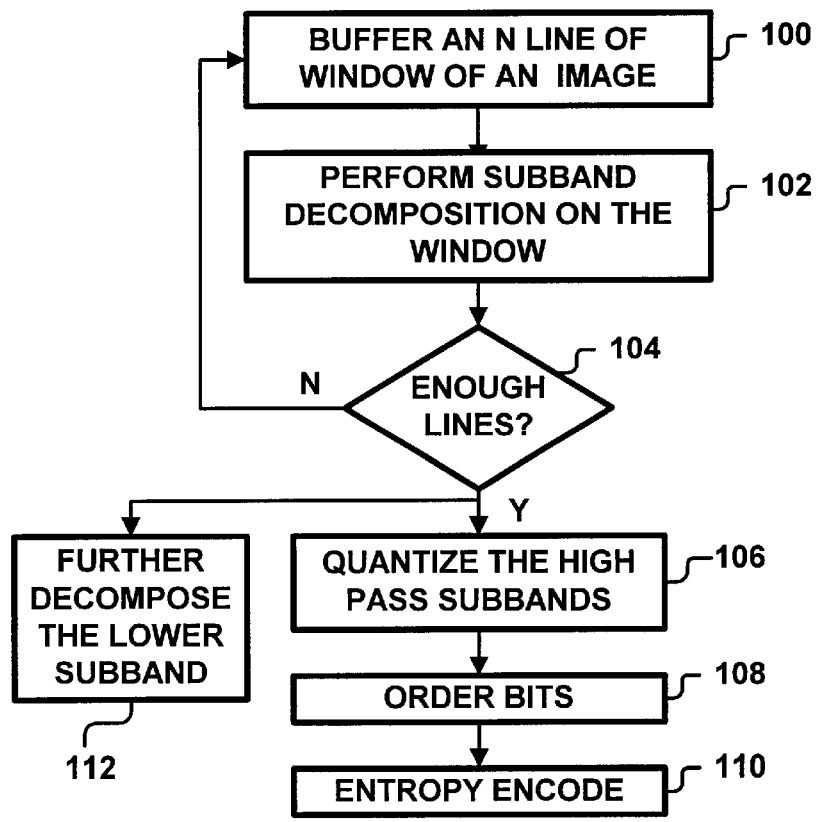
FIGURE 2

FIGURE 3
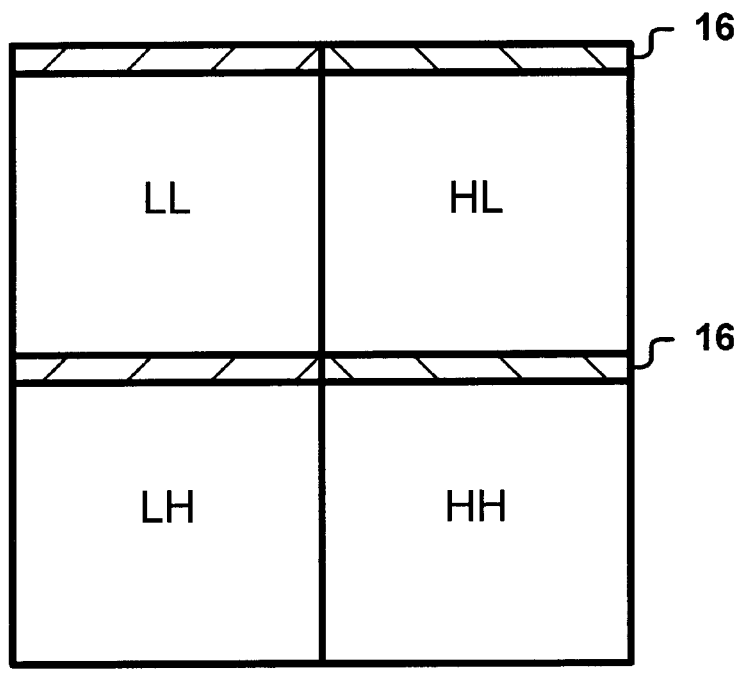
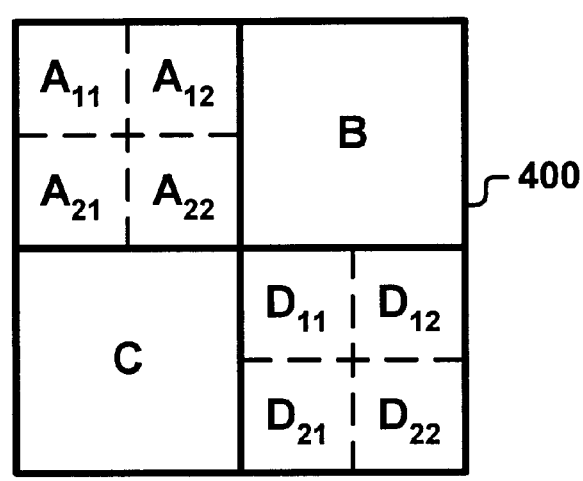
FIGURE 10

FIGURE 7
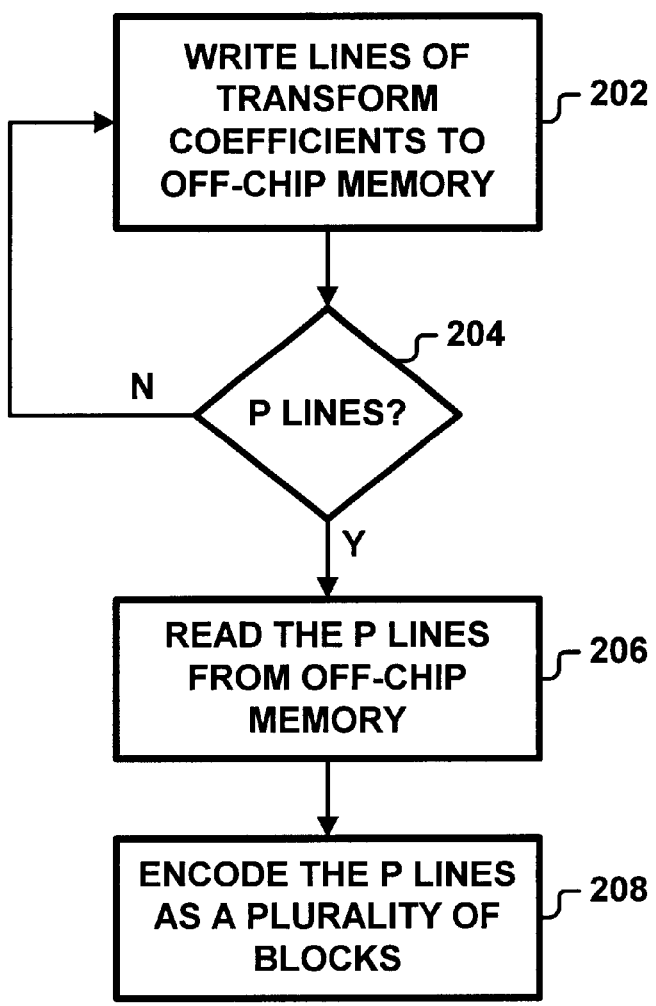
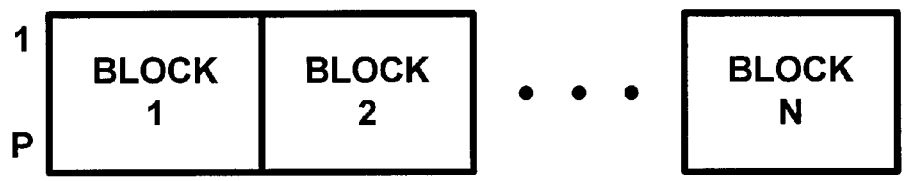
FIGURE 8

FIGURE 11
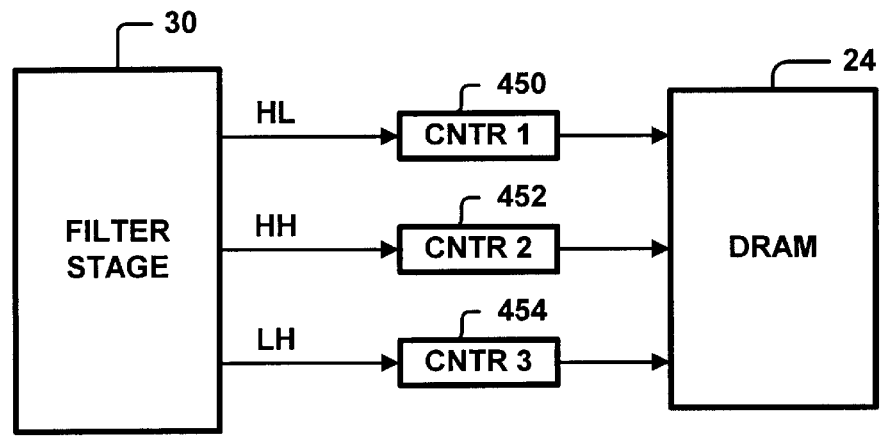
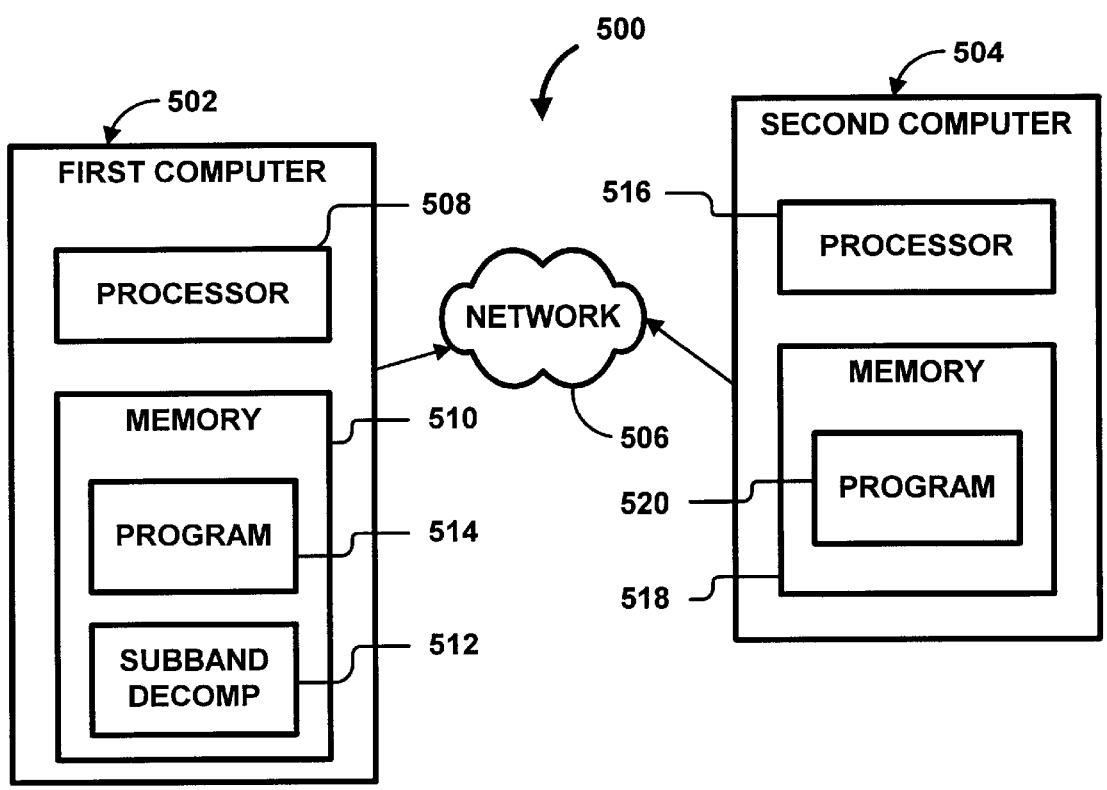
FIGURE 12

EFFICIENT WAVELET-BASED COMPRESSION OF LARGE IMAGES

BACKGROUND OF THE INVENTION

The invention relates to data compression. More specifically, the invention relates to subband decomposition of images.

Data compression is often used for reducing the cost of storing large data files on computers as well as reducing the time for transmitting large data files between computers. In the so-called "transform methods" data is transformed into coefficients that represent the data in a frequency domain. Coefficients may be quantized (lossy compression) without significantly affecting the quality of data that is eventually reconstructed from the quantized coefficients. Redundancy in the coefficients may then be reduced or eliminated (lossless compression) without affecting quality of the reconstructed data.

One well known class of transforms are Wavelet transforms. The Wavelet transforms may be used to perform subband decomposition and produce coefficients that describe the data in a hierarchical multiscale representation. Wavelet transforms have proven useful for the compression of images and the analysis of signals. They have been proposed as the transforms for the emerging "JPEG-2000" standard.

A subband decomposition is typically performed by storing an entire image in memory, performing high pass and low pass filtering on the entire image in one direction (e.g., the vertical direction), and then performing high and low pass filtering on the entire filtered image in another direction (e.g., the horizontal direction).

Among the advantages of the Wavelet transforms, the transform coefficients can be ordered in a hierarchical structure and transmitted in an "embedded bitstream." The embedded bitstream has a property whereby prefixes of the bitstream yield a continuum of lower rate descriptions of the data at the highest possible levels of quality. If the embedded bitstream is truncated during transmission of image data, for instance, the information already transmitted allows an entire image to be reconstructed. The quality of the reconstructed image is dependent upon the amount of information transmitted. If an embedded bitstream is truncated, a complete image of reduced quality can be reconstructed from the transmitted bits. In contrast, truncation of a non-embedded transmission might only allow several rows of an image to be reconstructed.

As additional information is transmitted, the quality of the reconstructed image is improved. If the entire bitstream is transmitted without truncation, a lossless or near-lossless image can be reconstructed.

The transmission just described is often referred to as a "progressive-by-quality" image transmission. The coefficients are described by bit-planes, and the most significant coefficient bits (that is, the coefficient bits conveying the most important information) are transmitted first.

Another type of transmission is often referred to as a "progressive-by-resolution" transmission. The progressive-by-resolution transmission involves ordering the coefficients according to different levels of image resolution. The different levels are identified by markers in the embedded bitstream. A computer may use the markers to parse the bitstream and transmit the data for the coefficients corresponding to a resolution that is specified by the receiving computer. The receiving computer can reconstruct an image according to the specified resolution.

Filters and encoders for compressing the image may be fabricated on a single Application-Specific Integrated Circuit ("ASIC") or "chip." A small cache of memory may also be fabricated on the chip.

The entire image, prior to filtering, is typically stored in off-chip memory such as DRAM. The entire image could be stored in the faster on-chip memory such as SRAM; however, the on-chip memory is typically much more expensive than off-chip memory. Moreover, if the image was to be stored entirely in on-chip memory, the usage of the chip would be restricted to images of certain sizes.

However, storing the entire image in off-chip memory can still be problematic. Here too, the memory would have to be large enough to store an entire image. Moreover, off-chip memory is expensive relative to the cost of the ASIC. As the size of memory is increased, the cost of performing the subband decomposition is also increased. This is true for image compression and image reconstruction.

For instance, printing applications at 1200 dot per inch ("dpi") and 24 bits per pixel use about 380 MB for storing an entire page (uncompressed). In the near future, resolution will be increased to 2400 dpi with 24 bits per pixel. This will require far more memory for storing an entire page. The cost of increasing the memory might seem trivial, but for high volume, low profit margin items such as printers, the cost increase can become quite significant.

Another problem with off-chip memory is I/O bandwidth. Increasing the size and resolution of an image will place higher constraints on computational complexity and memory I/O bandwidth. Increasing the I/O bandwidth to accommodate the greater number of I/O transactions will be expensive, but maintaining the I/O bandwidth (given the increase in image size and resolution) might produce unacceptable waiting times for various applications, such as printing images and displaying images on video monitors.

There is a need to reduce the size off-chip memory. There is also a need to reduce the number of I/O operations between the chip and off-chip memory. These needs will become greater as image resolution and image size are increased.

Moreover, it would be desirable to have a chip that can be used for different applications without being limited by the size of the image. It would also be desirable for the chip to generate an embedded bitstream or reconstruct an image from an embedded bitstream.

SUMMARY OF THE INVENTION

These needs and desires are met by various aspects of the present invention. According to one aspect of the present invention, an image is decomposed into a plurality of subbands. A progression of N line windows of the image is provided, where N is a positive integer, where 1<N<<K and where N is independent of K. In a first filter stage, vertical high and low pass filtering are performed on each N line window that is provided. Consequently, N lines of the image are filtered at a time until the entire image has been decomposed into the plurality of subbands.

According to another aspect of the present invention, transform coefficients of the subbands are coded into an embedded bitstream. The embedded bitstream represents the image in compressed form.

According to yet another aspect of the present invention, the image can be reconstructed from the embedded bitstream by decoding the embedded bitstream into a plurality of lines; forming chunks of N lines for each of the subbands of a given decomposition level; performing inverse horizontal filtering on each chunk of N lines; and performing inverse vertical filtering on the horizontally filtered chunks.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of an image being transformed in windows of N lines at a time;

FIG. 2 is a flowchart of a method of generating an embedded bitstream in accordance with the present invention, the embedded bitstream describing the image;

FIG. 3 is an illustration of a subband decomposition of the image;

FIG. 7 is a flowchart of a method of coding a plurality of subband lines as a plurality of independent blocks;

FIG. 8 is an illustration of a plurality of subband lines that have been coded as a plurality of independent blocks;

FIG. 10 is an illustration of a quad tree decomposition of a block;

FIG. 11 is an illustration of block staggering prior to encoding;

FIG. 12 is a block diagram of a system for reconstructing an image from an embedded bitstream;

DETAILED DESCRIPTION OF THE INVENTION

Figure 4:
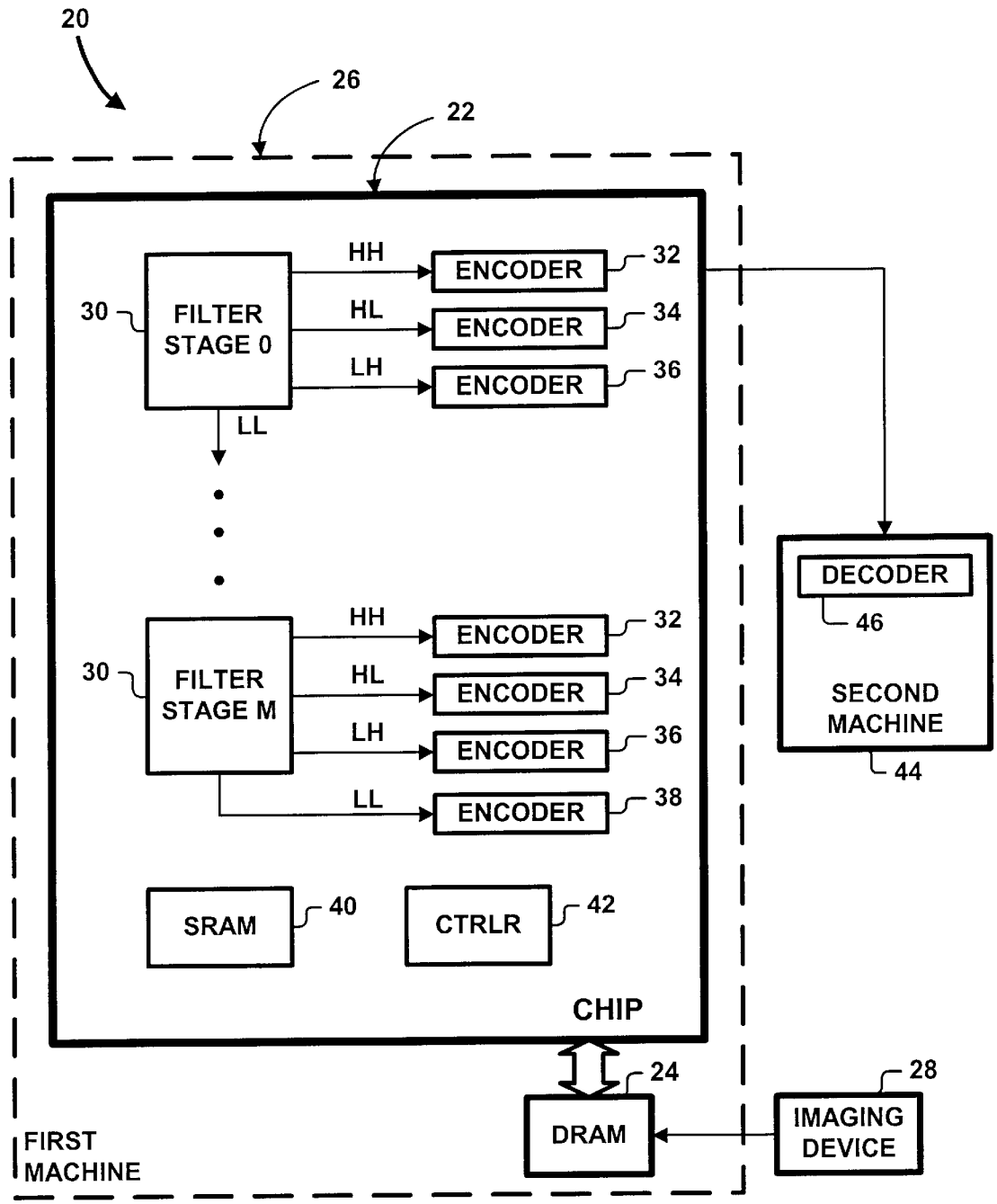
FIG. 4 is a block diagram of an apparatus for generating the embedded bitstream, the apparatus including a chip and off-chip memory.

As shown in the drawings for purposes of illustration, the present invention is embodied in methods and apparatus for compressing and reconstructing large images. The apparatus includes a chip and off-chip memory for performing the image compression or reconstruction. Size of the off-chip memory is minimized to reduce the cost of compression and reconstruction in applications such as client-server applications and host-printer applications. The number of I/O transactions between the chip and the off-chip memory is also reduced to increase the speed of performing image compression and reconstruction.

FIGS. 1 and 2 illustrate a method of generating an embedded bitstream from an image 10 (e.g., a bitmap of an image). The image 10 includes K rows or lines, where K is a positive integer. At each level, a subband decomposition is performed on N lines at a time, where N is a positive integer, where $1<N<<K$ and where N is independent of K. FIG. 1 shows a first window 12 (shown in solid lines) of N lines and a second window 14 of N lines (shown in dashed lines). These and other windows are figuratively "tiled" down the image 10 until all K rows of the image have been covered.

FIG. 1 also shows an overlap between the first and second windows 12 and 14. At least one line of the first window 12 will be retained in the second window 14. This is true of all of the other windows: each window being processed will include at least one line from the previous window.

The windows are processed in succession (block 100). Thus, the first window 12 is processed, followed by the second window 14, followed by a third window (not shown) and so forth until all K rows of the image have been decomposed at a first level. It is understood that windows starting at the top of the image may be supplied and processed prior to the first window 12.

Each window may be processed as soon as it becomes available. It is not necessary to wait for all of the windows to become available before processing begins.

Each window of N lines is processed by performing a subband decomposition (block 102). A Wavelets transform may be used. Vertical high-pass and low-pass filtering is performed on the window, and then horizontal high-pass and low-pass filtering is performed. Resulting is one or more lines 16 of transform coefficients for a high-pass horizontal, high-pass vertical subband HH; a high-pass horizontal, low-pass vertical subband HL; a low-pass horizontal, high-pass vertical subband LH; and a low-pass horizontal, low-pass vertical subband LL (see FIG. 3).

Successive windows are decomposed until a sufficient number of transform coefficient lines becomes available (block 104). Once a sufficient number of transform coefficient lines has become available, the transform coefficients of three of the subbands (HH, HL and LH) are quantized (block 106), ordered (block 108) and entropy encoded (block 110). The entropy encoded bits are immediately or eventually placed into the bitstream.

Once a sufficient number of lines of transform coefficients has become available, the lowest subband (LL) is further decomposed (block 112). Following this second level of decomposition, the lowest subband is further decomposed and the higher (i.e., high pass) subbands are quantized, ordered and entropy encoded, and the entropy encoded bits are placed in the bitstream.

The method can be implemented by hardware including a chip and off-chip memory. When realized as such, this method allows for a reduction in the size of off-chip memory. A window at a time may be stored and processed as opposed to storing and processing the entire image. The method also allows for a reduction in the number of I/O transactions between the chip and the off-chip memory.

FIG. 4 shows a system 20 including a chip 22 and off-chip memory 24 for generating an embedded bitstream from the image 10. The chip 22 and off-chip memory 24 may be part of a first machine 26 such as a computer.

The system 20 further includes an imaging device 28 such as a scanner. The imaging device 28 supplies multiple lines of image data (e.g., luminance or chrominance data of an image) at a time. The imaging device 28 may supply N lines at a time. The N lines are buffered in the off-chip memory 24. A circular buffering strategy could be used such that each window retains at least one line from a previous window of N lines. As each N-line window is made available in the off-chip memory 24, it is processed.

The chip 22 includes a first stage 30 of subband decomposition filters. The chip 22 reads an N line window from the off-chip memory 24 and the first stage 30 generates a plurality of subbands HH, HL, LH and LL, each subband being generated S lines at a time, where S is a positive integer and S<N. For instance, if N=10 and S=1, the decomposition of a 10-line window would produce a single line of transform coefficients for each subband HH, HL, LH and LL.

The chip 22 further includes first, second and third encoders 32, 34 and 36 corresponding to the higher subbands HH, HL and LH. Each encoder 32, 34 and 36 performs entropy encoding on P lines of its corresponding subband as soon as the P lines become available (P is a positive integer and P>S). Thus, the first encoder 32 encodes subband HH when P lines of subband HH become available, the second encoder 34 encodes subband HL when P lines of subband HL become available, and the third encoder 36 encodes subband LH when P lines of subband LH become available.

The chip 22 further includes a number M of additional cascaded stages of subband decomposition filters. Each additional stage 30 performs decomposition on an N line window of a lowest subband generated by the previous stage. First, second and third encoders 32, 34 and 36 are provided for each of the additional stages 30. The lowest subband of the $M^{th}$ stage 30 is encoded by a fourth encoder 38.

Each encoder 32, 34, 36 and 38 performs entropy encoding. Each encoder 32, 34, 36 and 38 may also perform quantization and bit ordering prior to encoding.

The chip 22 further includes on-chip memory 40 such as SRAM. The on-chip memory 40 may be used for filtering operations performed by each stage 30.

The chip 22 may also include a controller 42 for controlling the buffering of the image lines in the off-chip memory 24, for determining when a window of N lines has been buffered, and for accessing the N line windows from the off-chip memory 24. In the alternative, such control could be performed by the imaging device 28 or by a host processor of the first machine 26.

The system 20 further includes a second machine 44 having a decoder 46 for reconstructing the image from the embedded bitstream. Reconstruction of the embedded bitstream will be described below in connection with FIGS. 14 and 15. If the second machine 44 is a printer, the reconstructed image may be printed. If the second machine 44 is a computer, the reconstructed image may be displayed on a video monitor.

During an exemplary operation, a large image is scanned by the imaging device 28 and stored, line-by-line, in the off-chip memory 24. The chip 22 compresses the image into an embedded bitstream. The embedded bitstream could be stored in the first machine 26 or sent directly to the second machine 44 for display or printing. The decoder 46 reconstructs the image from the embedded bitstream, and the reconstructed image is displayed or printed several lines at a time.

If the embedded bitstream is truncated during the printing operation, the second machine 44 would still be able to display or print the entire image, provided that at least some subbands were received by the second machine 44. However, details contained in the subbands that were lost due to truncation would not be displayed.

Figure 5:
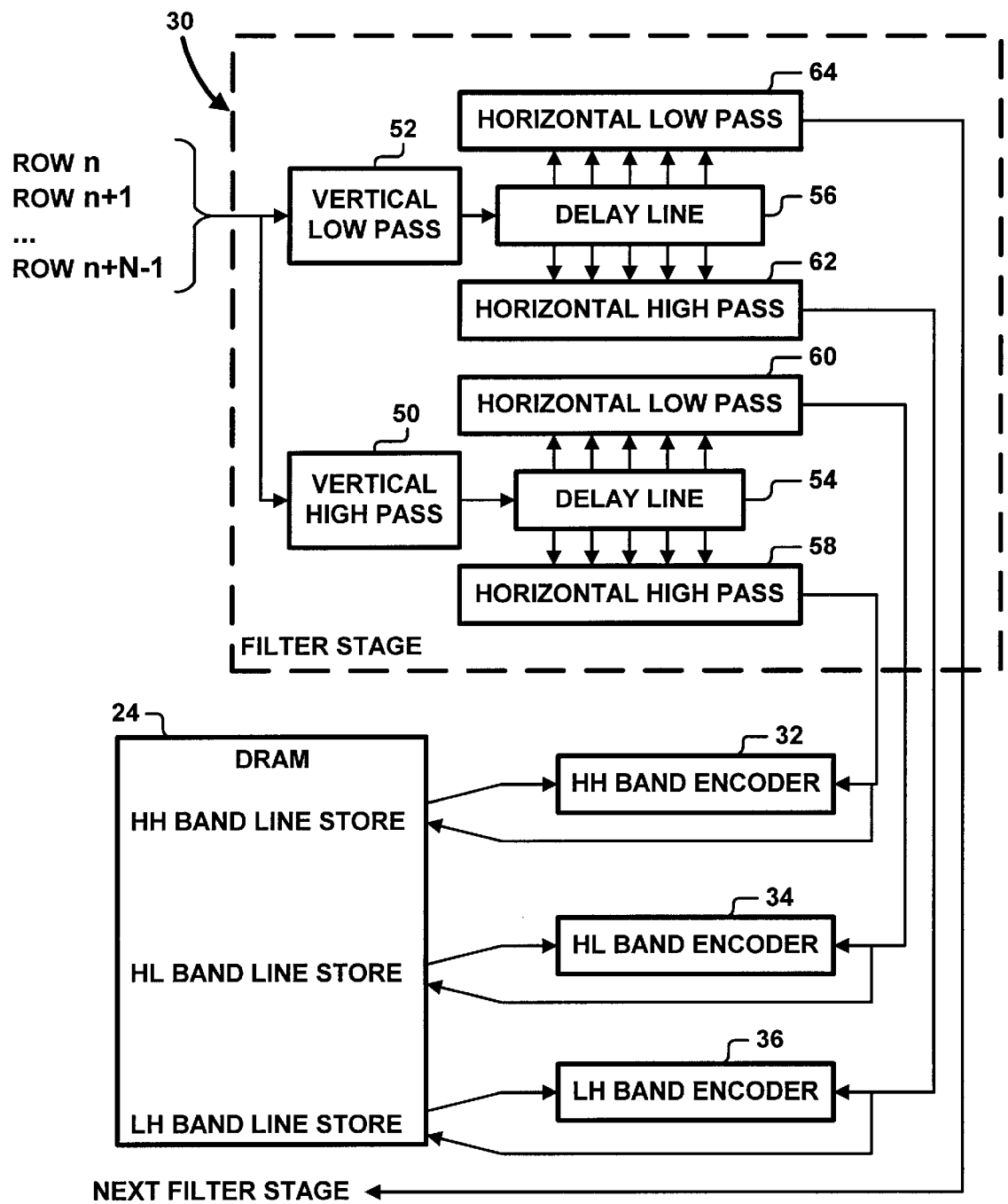
FIG. 5 is a block diagram of a filter stage, corresponding encoders and off-chip memory for the apparatus.

FIG. 5 shows a first embodiment of the filter stage 30 in greater detail. The filter stage 30 includes a vertical high pass filter 50 and a vertical low pass filter 52 for performing vertical high and low pass filtering on each N-line window that is buffered in the off-chip memory 24. Results of the vertical filtering are temporarily delayed by a pair of delay elements 54 and 56 until entire lines become available for horizontal filtering. The filter stage 30 further includes a first pair of horizontal high and low pass filters 58 and 60 for performing horizontal high and low pass filtering on an output of the vertical high pass filter 50; and a second pair of horizontal high and low pass filters 62 and 64 for performing horizontal high and low pass filtering on an output of the vertical low pass filter 52.

The horizontal high and low pass filters 58, 60, 62 and 64 are conventional. They may filter entire rows in a horizontal direction. The vertical filters 50 and 52 may perform convolution or lifting. Filters such as Daubechies 9/7 and 5/3 bi-orthogonal filters can be used for the vertical filtering. In a Daubechies 9/7 bi-orthogonal filter, for example, all nine coefficients are used for convolution by one of the vertical filters and all seven coefficients are used for convolution by the other of the vertical filters. Coefficient bits are stored in, and accessed from, the off-chip memory 24 and information about sign, significance and current bit-plane are stored in the on-chip memory 40.

The window size (i.e., N ) is about two times filter length. For a 5/3 bi-orthogonal filter, for example, the window size may be N=10 lines.

It is preferable to perform the vertical filtering before performing the horizontal filtering. This allows the vertical filters 50 and 52 to perform filtering on lines having a lower bit depth than the lines filtered by the horizontal filters 58, 60, 62 and 64. For example, the vertical filters 50 and 52 may perform filtering on lines having a first bit depth of eight bits, and the horizontal filters 58, 60, 62 and 64 may perform filtering on lines having a second bit depth of sixteen bits.

FIG. 5 also shows the off-chip memory 24 and the encoders 32, 34 and 36 corresponding to the filter stage 30. The chip reads lines n to (n+N−1) from the off-chip memory 24, and the N-line window is decomposed by the filter stage 30. Subband lines generated by the filter stage 30 are written to the off-chip memory 24. When a sufficient number of lines becomes available for encoding a subband, the lines corresponding to that subband are read from the off-chip memory 24 and encoded.

Figure 6:
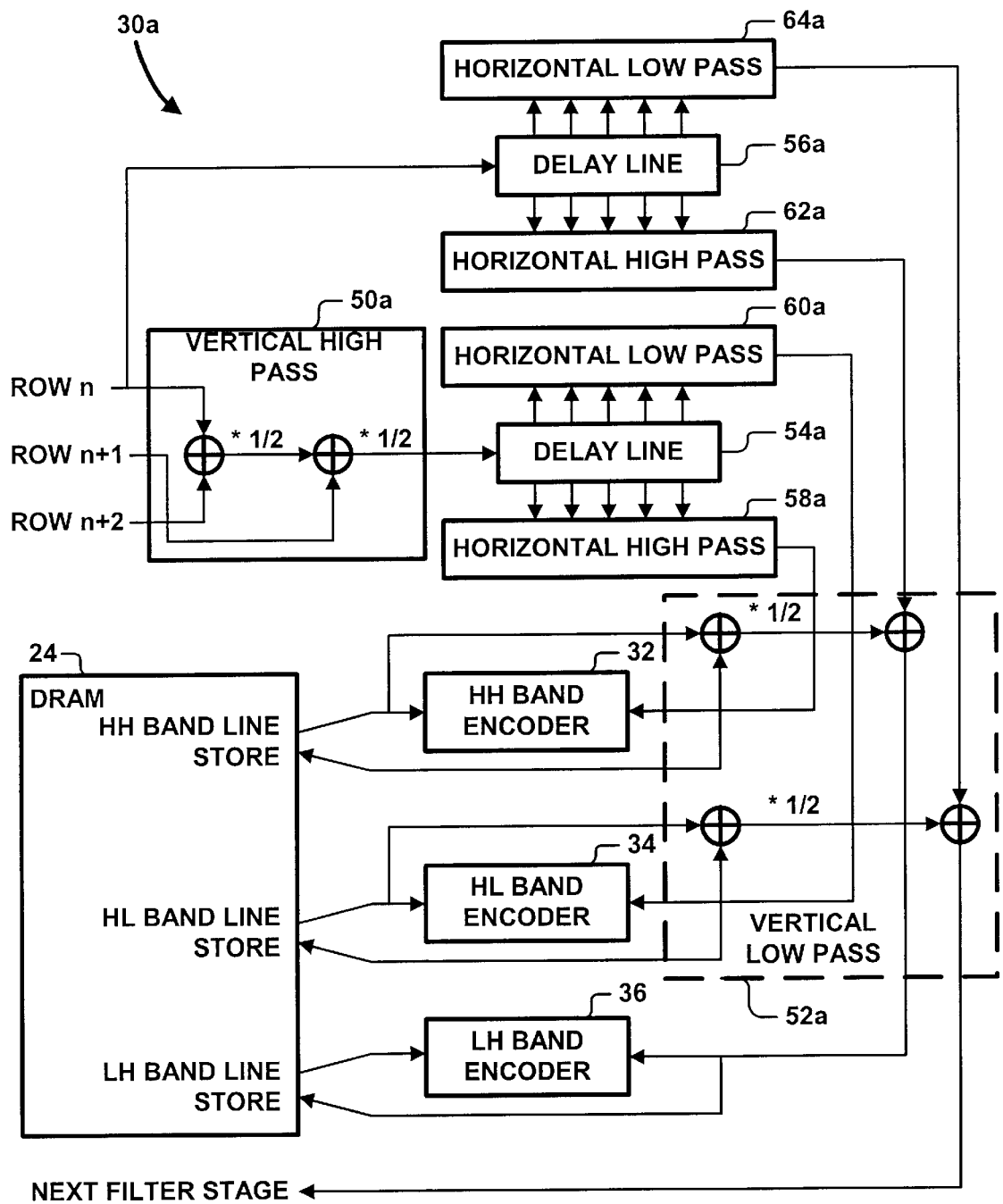
FIG. 6 is a block diagram of an alternative filter stage, corresponding encoders and off-chip memory for the apparatus.

FIG. 6 shows an alternative embodiment of a filter stage 30a. The filter stage 30a uses a 5/3 bi-orthogonal filter, which has a length of five, and it filters a window having a size of three lines (n, n+1, n+2). The filter stage 30a includes a vertical high pass filter 50a for performing vertical lifting steps on the three-line window. An output of the vertical high pass filter 50a is delayed by a first delay element 54a, and the delayed output is filtered by a pair of horizontal high-pass and low-pass filters 58a and 60a. The first line (n) of the three-line window is delayed by a second delay element 56a and filtered by a second pair of horizontal high-pass and low-pass filters 62a and 64a.

The filter stage 30a further includes a vertical low pass filter 52a for performing horizontal lifting on outputs of the first and second pairs of horizontal high and low pass filters 58a, 60a, 62a and 64a. The lowest subband is sent to the next filter stage, and the higher subbands are sent to the encoders 32, 34 and 36.

Thus, vertical high pass and low pass samples are formed in a succession of lifting steps as follows:

$$H_n(i)=0.5[x_{2n+1}(i)-0.5(x_{2n}(i)+x_{2n+2}(i))]; \text{ and}$$

$$L_n(i)=x_{2n}(i)+0.5[H_{n-1}(i)+H_n(i)]$$

where $x_n(i)$ denotes the $i^{th}$ sample on the nth row of the image; and $H_n(i)$ and $L_n(i)$ denote the $i^{th}$ sample from each of the vertical high pass and vertical low pass subbands. The horizontal transform is applied to each of these vertical subband rows in the usual manner. The filter stage 30a implements these lifting steps in the vertical direction. The horizontal transform is applied between the first and second lifting steps of the vertical transform, but does not affect the result, since the horizontal and vertical filtering operations commute with one another. Although the horizontal transform may be applied in any manner, lifting steps will allow single byte precision to be preserved.

By processing a window size of three and a by having a filter length of five, the filter stage 30a pushes memory needs from one plane to another in order to get some memory savings. This stage 30a essentially performs the vertical filtering in two stages.

The first lifting step in the implementation of the vertical 5/3 bi-orthogonal wavelet transform (i.e., the lifting step $H_n$) may be interpreted as replacing samples in the odd rows of the image with the difference between these samples and a prediction formed by taking the average of samples immediately above and below on the adjacent even rows of the image. These prediction residuals are in fact the vertical high-pass samples. Since compression performance is strongly related to the degree to which the signal energy in high pass bands can be reduced, better results can be obtained by using a more sophisticated predictor. In particular, the first lifting step may be replaced by:

$$H_n(i)=0.5[x_{2n+1}(i)-P(x_{2n}, x_{2n+2})(i))]$$

where the operator P exploits local orientation features of the image to predict the odd row samples $x_{2n+1}(i)$ from nearby samples from two neighboring rows $x_{2n}(i)$ and $x_{2n+2}(i)$.

There are a number of different orientations for the vertical filters. For each orientation, a Predictor $P^i$ and an objective value $O^i$ are computed such that orientations with smaller objective values are more likely to reflect orientation in the underlying scene. Additional on-chip logic may be used to select the orientations. Five orientations are as follows.

Vertical:

$$P^0(i)=0.5[x_{2n}(i)+x_{2n+2}(i)]$$

$$O^0(i)=\Sigma\|x_{2n}(i+k)-x_{2n+2}(i+k)\| \text{ for } k=-2 \text{ to } k$$

−45° from Top-Left to Bottom-Right:

$$P^{-45}(i)=0.5[x_{2n}(i-1)+x_{2n+2}(i+1)]$$

$$O^{-45}(i)=\Sigma\|x_{2n}(i+k-1)-x_{2n+2}(i+k+1)\| \text{ for } k=-2 \text{ to } k$$

+45° from Top-Left to Bottom-Right:

$$P^{+45}(i)=0.5[x_{2n}(i+1)+x_{2n+2}(i-1)]$$

$$O^{+45}(i)=\Sigma\|x_{2n}(i+k+1)-x_{2n+2}(i+k-1)\| \text{ for } k=-2 \text{ to } k$$

−23° from Top-Left to Bottom-Right:

$$P^{-23}(i)=0.5[x_{2n}(i-0.5)+x_{2n+2}(i+6.5)]$$

$$O^{-23}(i)=\Sigma\|x_{2n}(i+k-0.5)-x_{2n+2}(i+k+0.5)\| \text{ for } k=-2 \text{ to } k$$

+23° from Top-Left to Bottom-Right:

$$P^{+23}(i)=0.5[x_{2n}(i+0.5)+x_{2n+2}(i-0.5)]$$

$$O^{+23}(i)=\Sigma\|x_{2n}(i+k+0.5)-x_{2n+2}(i+k-0.5)\| \text{ for } k=-2 \text{ to } k$$

Let $O^{min}(i)$ denote the minimum of these five objective values and $P^{min}(i)$ denote the corresponding predictor at each sample location. A simple, robust orientation adaptive predictor can be formed by combining the regular vertical interpolator with the value of $P^{min}$ according to $$P(i)=\alpha(i)P^0(i)+(1-\alpha)P^{min}(i)$$

where the mixing parameter $\alpha(i)$ is given by $$\alpha(i)=[O^{min}(i)+1]/[O^0(i)+1]$$

The mixing parameter $\alpha(i)$ may be modified as follows:

$$\alpha(i)=\max\{1,[O^{min}(i)+2\min\{0,O^0(i)-O'(i)\}+2\min\{0, O^0(i)-O''(i)\}+1]/[O^0(i)+1]\}$$

where $O'(i)$ and $O''(i)$ are identified with the negative angle objectives $O^{-45}$ and $O^{-23}$ if the optimum angle is positive, with the positive angle objectives $O^{+23}$ and $O^{+45}$ if the optimum angle is negative, and with the vertical objective $O^0$ otherwise. The modified mixing parameter is a continuous and reasonably smooth function of the underlying sample values which reduces susceptibility to the effects of quantization error in the decoder. It has the effect of suppressing the influence of anything other than the vertical predictor when the local orientation is ambiguous.

Reference is now made to FIGS. 7 and 8, which describe a block coding technique used by each of the encoders 32, 34, 36 and 38. In block coding of a given subband (the HH subband, for example), the chip 22 writes lines of transform coefficients to the off-chip memory 24 (block 202). Once a number P of lines for the given subband become available (block 204), the encoder 32 accesses the P lines from off-chip memory 24 (block 206) and encodes the P lines of the HH subband as a plurality of blocks (block 208). The blocks generated from every P lines are encoded independently of one another. Typical block sizes might be 64×64 samples, 32×32 samples, 64×16 samples or 128×8 samples.

An embedded bitstream may be generated by independently encoding the subband decomposition blocks according to U.S. Ser. No. 09/213,743 filed Dec. 17, 1998 and entitled "DECODING OF EMBEDDED BITSTREAMS PRODUCED BY CONTEXT-BASED ORDERING AND CODING OF TRANSFORM COEFFICIENT BIT-PLANES" (the "Ordentlich et al. Patent Application"), which is assigned to the assignee of the present invention. The Ordentlich et al. Patent Application is incorporated herein by reference. Coding of each block is performed by steps including quantizing the transform coefficients, generating bit-planes of the quantized coefficients; decomposing the bit-planes into different subsequences (e.g., Non-Zero Neighbors, Non-Zero Parents, Run and Refinement); ordering the subsequences according to decreasing expected distortion reduction per expected bit of description; encoding the ordered subsequences; and placing the subsequences in a bitstream as ordered. The context for ordering a given bit-plane of a block may be contained entirely within previously-decoded bit-planes of that block. The context for ordering a given bit-plane of a block may also be contained within previously-decoded bit-planes of "parent blocks." The term parent blocks refers to blocks in corresponding spatial orientations in lower resolution subbands.

Figure 9:
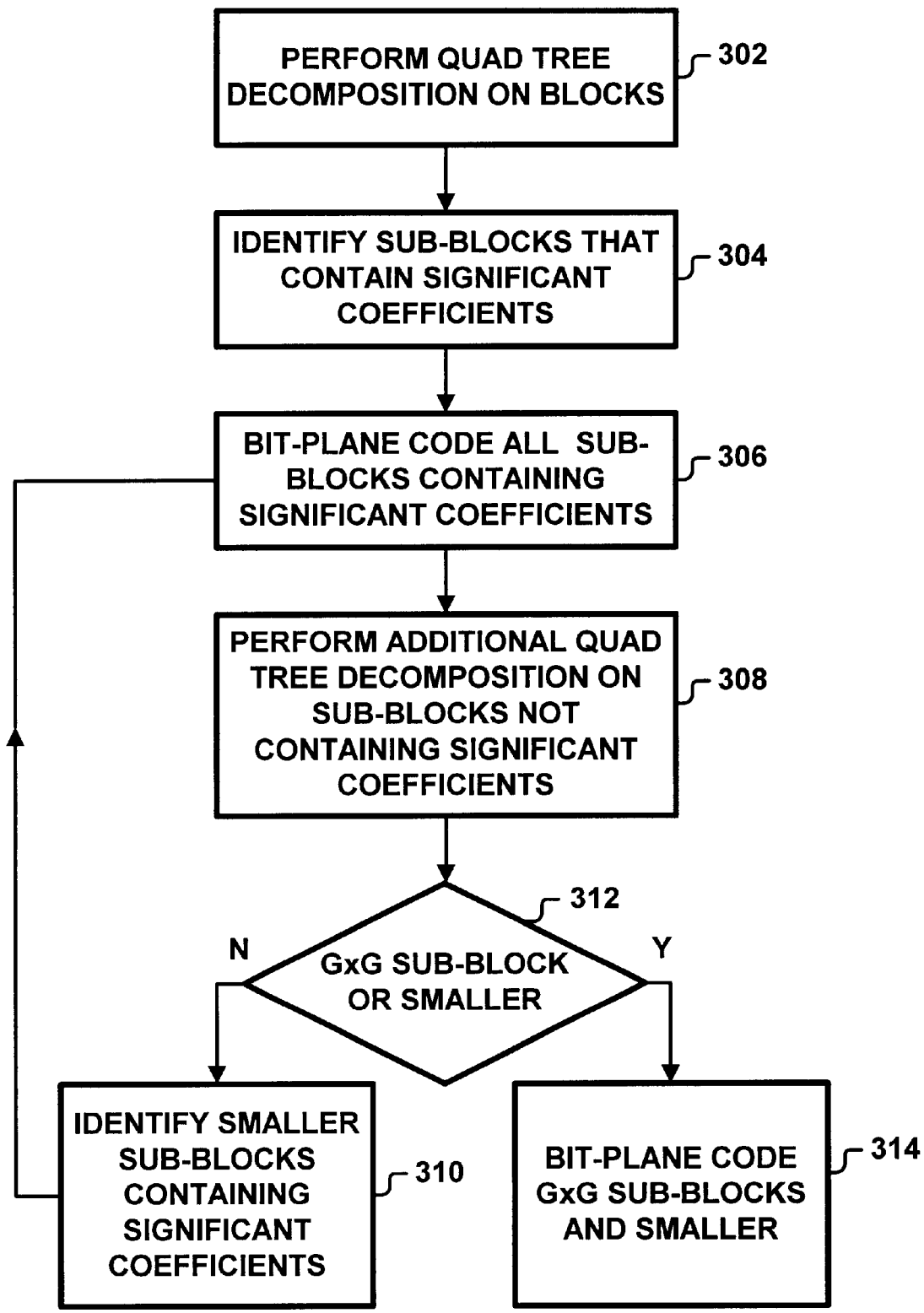
FIG. 9 is a flowchart of an alternative method of coding a plurality of subband lines as a plurality of independent blocks, the alternative coding method including a combination of quad tree coding and bit-plane coding.

FIG. 9 illustrates a more elaborate scheme of generating an embedded bitstream for each block of transform coefficients. Each block is coded by a combination of quad tree decomposition and bit-plane coding. A given block is coded by steps that include performing a quad tree decomposition on the given block (block 302), whereby the given block is split into a plurality of sub-blocks; identifying the sub-blocks that contain significant coefficients (block 304); bit plane coding all sub-blocks containing significant coefficients (block 306); and performing an additional quad tree decomposition on the blocks having insignificant coefficients (block 308).

Another level of quad tree decomposition and bit-plane coding is then performed on each sub-block not having significant coefficients. Thus, the sub-blocks not having significant coefficients are further decomposed into smaller sub-blocks (block 310).

Those smaller sub-blocks having significant coefficients are bit-plane coded (block 306), and those smaller sub-blocks not having significant coefficients are further decomposed into even smaller blocks (block 308).

When the typical sub-block is decomposed to a size of G×G (block 312), which is the smallest sub-block produced by the quad tree decomposition, the G×G sub-blocks and any smaller sub-blocks are bit-plane coded (block 314). Certain sub-blocks lying at the boundaries of the image might be smaller than G×G. For example, certain sub-blocks lying at the boundaries might be G×2, G×1, 1×G, etc.

The sub-blocks may be bit-plane coded using the block coding techniques described in the Ordentlich et al. Patent Application.

An example of this hybrid coding scheme is illustrated in FIG. 10. Two levels of quad tree decomposition on a block 400 are shown. Initially, the block 400 contains 64×64 samples. A first level of quad tree decomposition produces four 32×32 sample sub-blocks: A, B, C and D. Sub-blocks B and C are found to have significant coefficients and, therefore, are bit-plane coded. Next, sub-block A is decomposed into smaller 16×16 sample sub-blocks A11, A12, A21 and A22, and sub-block D is decomposed into smaller 16×16 sample sub-blocks D11, D12, D21 and D22. After the second level of quad tree decomposition, sub-blocks A11, A21 and D11 are found to have significant coefficients and, therefore, are bit-plane coded. The remaining sub-blocks A12, A22, D12, D21 and D22 will be further decomposed into even smaller 8×8 sub-blocks.

An even more elaborate scheme for performing block coding and generating an embedded bitstream is disclosed in U.S. Ser. No. 09/267,248, filed concurrently herewith, entitled "EMBEDDED BLOCK CODING WITH OPTIMIZED TRUNCATION," assigned to the assignee of the present invention, and incorporated herein by reference.

Block coding is not equivalent to dividing the image into smaller tiles and compressing each tile independently. Although the coding is performed independently on blocks, the transform is not performed on a block-by-block basis. A reason for this is to avoid introducing block artifacts. Another difference between block coding and compression of independent tiles is that the blocks that are coded in different subbands do not generally represent the same region in the original image. If the block size is identical in all bands, then blocks in lower resolution bands represent successively large regions in the original image.

During encoding, locations of the blocks in each of the three subbands LH, HL and HH may be staggered at any given resolution level. Block staggering may be performed by offsetting vertical boundaries of the subbands HL, LH and HH by P/3 lines with respect to one another. For example, the subband HL is offset by P/3 rows and subband LH is offset by 2P/3 rows. When P rows of subband HH have been stored in the off-chip memory 24 (and, therefore, are available for encoding), only 2P/3 lines of the subband HL and P/3 lines of subband LH have been stored in the off-chip memory 24. When P rows of subband HL have become available for encoding, only 2P/3 lines of the subband LH and P/3 lines of subband HH have been stored in the off-chip memory 24. When P rows of subband LH have become available for encoding, only 2P/3 lines of the subband HH and P/3 lines of subband HL have been stored in the off-chip memory 24.

FIG. 11 illustrates how the subbands HL, LH and HH are staggered by P/3 lines with respect to one another. Counters 450, 452 and 454 may be provided for the three subbands HH, HL and LH of a given filter stage. The counters 450, 452 and 454 are initialized with different values 0,P/3,2P/3. Each time a line is outputted for a given subband, the counter-corresponding to the given subband is incremented. When a counter becomes larger than the block size P, the counter is set to zero and the blocks from the given subband are encoded. For example, during the first stripe coding for two of the three subbands, the number of lines available for coding will be less than P, even though the corresponding counters are equal to P. Thus, during the first stripe coding, P lines of one subband will be coded, 2P/3 lines of another subband will be coded, and P/3 lines of the third subband will be coded.

Block staggering reduces the total amount of off-chip memory 24 used for encoding by P lines. The block coding also reduces coding "jitter" since the block coding load is distributed more uniformly across time. This in turn reduces the amount of additional memory that is allocated to absorb "jitter" in applications that generate or consume image rows at a constant rate.

Block coding has a number of potential advantages. For instance, blocks can be selectively transmitted and regions-of-interest can be reconstructed.

Figure 13:
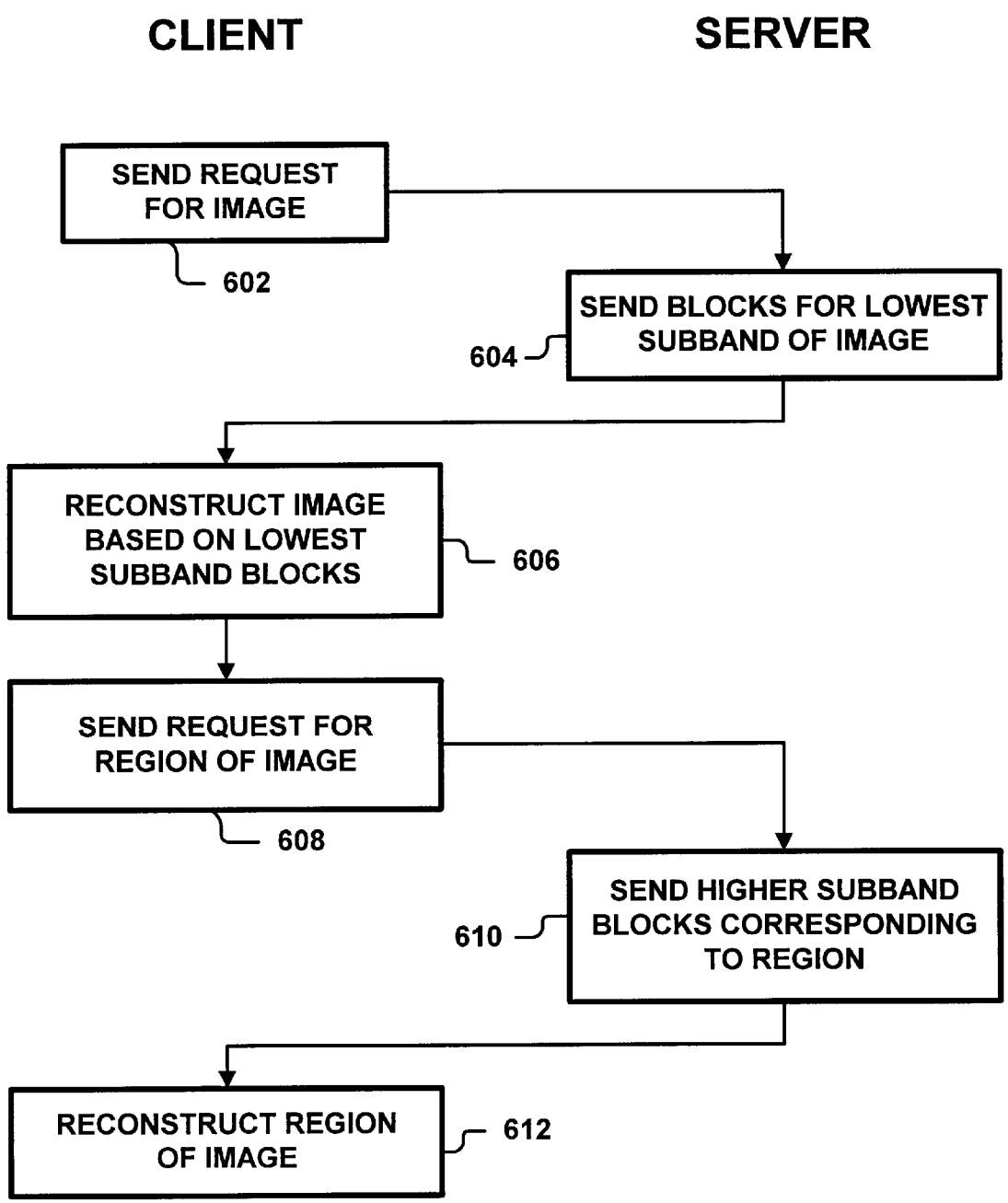
FIG. 13 is a flowchart of an exemplary transaction performed by the system of FIG. 12.

Reference is now made to FIGS. 12 and 13, which illustrate a system and method for performing region-of-interest reconstruction. FIG. 12 shows a system 500 including a server 502 and a client 504 that communicate over a network 506. The network 506 could be anything from a local area network to the Internet.

The server 502 includes a processor 508 and memory 510. The server memory 510 is encoded with a subband decomposition 512 of an image. The subband decomposition 512 includes a lowest resolution subband and a plurality of higher resolution subbands. Each subband is coded as a plurality of blocks, with each block representing a region of the image. Different resolutions of the regions are represented in different subband blocks.

The server memory 510 is further encoded with a program 514 that instructs the server processor 508 to place the lowest resolution subband on the network 506 in response to a network request for the image. The server program 514 further instructs the server processor 508 to place at least one additional block on the network 506 in response to a network request for a region of the image. The additional block or blocks provide a higher resolution of the requested region.

The client 504 includes a second processor 516 and memory 518 for storing a program 520. The client program 520 instructs the client processor 516 to send network requests for images and regions of the image. The network requests may be generated interactively by a user.

The client program 520 further instructs the client processor 516 to receive blocks sent by the server 502 in response to the network requests, and reconstruct an image and region-of-interest from the blocks received on the network 506.

FIG. 12 shows a client 504 that reconstructs images entirely via software. In the alternative, the client 504 may include a chip and off-chip memory for reconstructing the image and regions of interest.

FIG. 13 shows an exemplary transaction between the server 502 and the client 504 in which the client 504 requests information about a region of a country. Running on the client 504 is a program such a web browser. A user enters a URL of a map of the country, and the client 504 places a request for the map on the network 506 (block 602).

The server 502, which stores a subband decomposition of the map, receives the network request, accesses blocks in a low subband of the decomposition, and sends all of the low subband blocks to the client 504 (block 604).

The client 504 receives the blocks and reconstructs a low resolution image of the entire map (block 606). The low resolution map is displayed to the user. Using an input device such as a mouse, the user clicks on a region of the map, and the client generates a request for the region of interest. The request is sent to the server 502 (block 608).

The server 502 receives the request and accesses blocks corresponding to the region-of-interest. The blocks are taken across different subbands. The server 502 sends these higher subband blocks to the client 504 (block 610).

The client 504 receives the blocks and reconstructs the region-of-interest (block 612). The region-of-interest is displayed to the user. The resolution of the reconstructed region (that is, the detail of the region of interest) depends upon the subbands that are accessed by the server 502.

This client-server application involves a large compressed image that resides on a remotely located server and that is accessed and reconstructed interactively by an individual client interested in a smaller region of the image. The server 502 only sends those higher resolution code blocks that are relevant to the region of interest. The region of support of the subband synthesis filters should be taken into account in determining the set of subband samples which are covered by the blocks that are sent to the client.

Blocks at lower resolution levels may span a substantial portion of the image so that more information is transmitted than the client has actually been requested. This is done to ensure that the region of interest is correctly reconstructed. In most region of interest decoding applications, however, an interactive user will be able to pan across a larger region of the image over time, so that the amount of new information which is transmitted during such operations will be roughly commensurate with the size of the region which is ultimately covered, provided that previously received code blocks are properly cached and reused.

Each block of each subband can be transmitted progressively so that available network bandwidth can be utilized to progressively improve the quality of a region of interest. This will depend upon the amount of time the interactive user spends on that region before panning to a new region of interest. This is a particularly attractive feature for interactive browsing of large images over the internet where most consumers have very low bandwidth links and limited patience.

Another client-server application of block coding involves selectively refining regions of a large image based on an accumulated history of client requests. In the event that the whole image or a large portion of the image is requested, more rate can be allocated to the blocks corresponding to those regions of the image most often requested in the past, with the hope that the interactive user is primarily interested in these regions. The regions of interest will thus have been transmitted at a higher quality level in anticipation of the client's preference. Additionally, if storage space on the server becomes tight, and more data must be accommodated, the bitstreams corresponding to less frequently requested blocks of images can be truncated to free up space.

Figure 14:
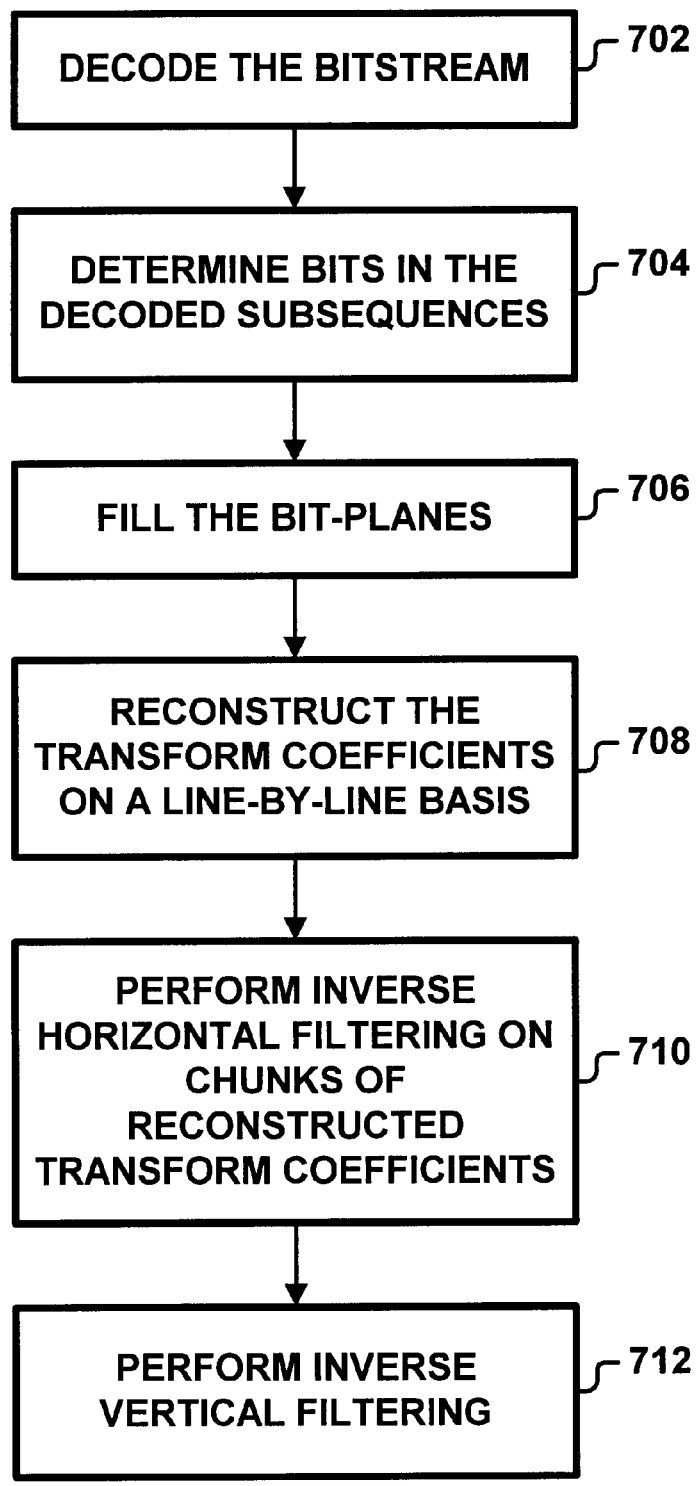
FIG. 14 is a flowchart of a method of reconstructing an image from an embedded bitstream in accordance with the present invention.

Reference is now made to FIG. 14, which shows a method of reconstructing an image 10 from an embedded bitstream. The image may be reconstructed by reversing the method used to generate the embedded bitstream. For instance, if the bitstream was generated via the filtering method of FIG. 1 and the block coding method of FIG. 7 (wherein the blocks are quantized, ordered and coded according to the method described in the Ordentlich et al. Patent Application), the image would be reconstructed by decoding the bitstream (block 702), determining the bits in subsequences in the decoded bitstream (block 704), and filling the bit-planes from the determined subsequences, wherein the context for filling a given bit-plane of a block may be contained entirely within previously-decoded bit-planes of that block and may also be contained within previously-decoded bit-planes of parent blocks (block 706).

The quantized transform coefficients are then reconstructed from the bit-planes (block 708). The reconstructed transform coefficients values may be in the middle of the available uncertainty interval.

As the steps indicated by blocks 702 to 708 are performed, the reconstructed transform coefficients become available for inverse transform filtering. If the entire image is being reconstructed, the reconstructed transform coefficients become available on a line-by-line basis. Thus a first line of transform coefficients for each subband of a given decomposition level might appear as illustrated in FIG. 3. If a region-of-interest is being reconstructed, only those transform coefficient blocks corresponding to the region of interest would be made available.

Once a sufficient number of partial or complete lines have been made available (that is, once a chunk of N lines has been formed), inverse horizontal filtering is performed on each chunk of N lines (block 710); and inverse vertical filtering is performed on the horizontally filtered chunks (block 712).

The entire image or region-of-interest will be reconstructed in several passes. During each pass, new information will be displayed several lines at a time. Thus, a low resolution image or region-of-interest will be reconstructed several lines at a time during the first pass. Detail will be added several lines at a time during the second and subsequent passes. If the embedded bitstream is truncated, all complete blocks that have been received will be displayed (since the blocks are coded independently of one another). Thus, if the bitstream is truncated, the upper half of the image or region-of-interest might contain relatively sharp features whereas the lower half contains blurred features.

Figure 15:
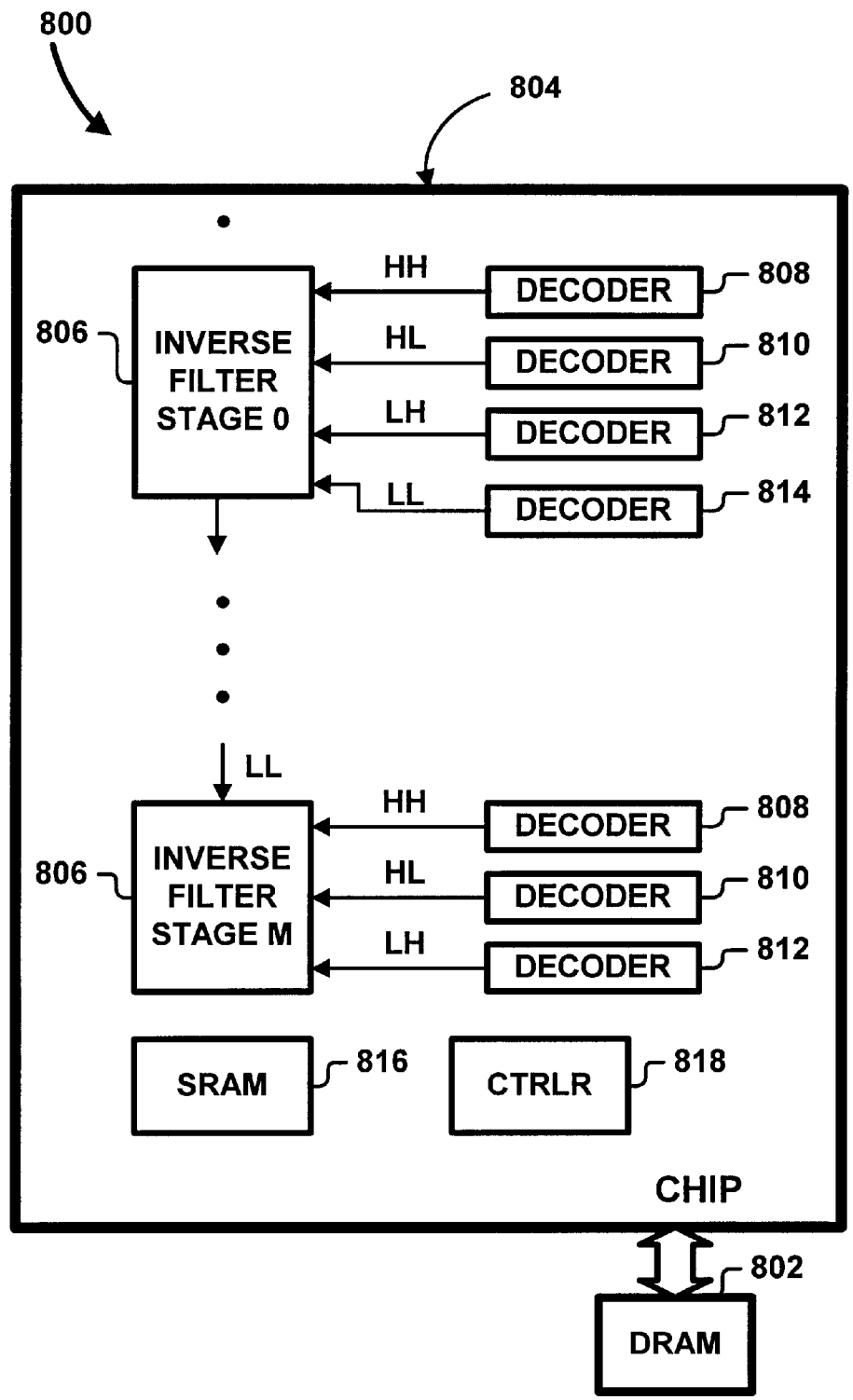
FIG. 15 is a block diagram of an apparatus for reconstructing an image from embedded bitstream, the apparatus including a chip and off-chip memory.

Referring now to FIG. 15, the image reconstruction can be performed by apparatus 800 including off-chip memory 802 and a chip 804 including multiple inverse filtering stages 806 and decoders 808, 810 and 812 for each filter stage. The first filtering stage would include an additional decoder 814 for the lowest subband LL. On-chip memory 816 is used for the inverse filtering operations. An on-chip controller 818 can determine when chunks of transform coefficients become available for inverse filtering. The chip 804 could be mounted to a video card of a client. In the alternative, the image reconstruction could be performed entirely in software by a host processor (e.g., the client processor 516). The reconstructed image could be buffered in external memory (e.g., off-chip DRAM, a hard drive, video memory) prior to display or printing.

If block staggering was used during image compression, it would not be necessary to reverse the block staggering during reconstruction of the image. However, performing block staggering during the image reconstruction would conserve off-chip memory. Writes of transform coefficient subbands to the off-chip memory 802 may be offset by P/3 lines with respect to one another. As soon as a subband chunk becomes available in the off-chip memory 802, a corresponding decoder could decode that chunk into quantized transform coefficients.

If a combination of quad tree decomposition and bit-plane coding was used during image compression, the bit-plane coding of each received sub-block would be reversed, and the quad tree decoding would be reversed to reassemble the sub-blocks into blocks.

If the vertical filters were rotated during image compression, it would not be necessary to rotate the vertical filters during reconstruction of the image. However, rotating the vertical filters would improve quality of the reconstructed image. It should be noted, however, that when the modified lifting step is reversed, the relevant orientation-adaptive predictor is derived from somewhat distorted copies of the even row samples, since the image compression is expected to introduce quantization errors. It follows that the operator P should be as insensitive as possible to small errors in its input.

Thus disclosed is an invention that performs subband decomposition without storing an entire image. Consequently, the invention reduces the size of both on-chip and off-chip memory used for image compression and subsequent reconstruction. The invention also reduces the number of I/O transactions between the chip and off-chip memory. The off-chip memory can store between ten and a couple hundred lines to process an image of any size. The I/O memory bandwidth can be reduced to about three and five byte transactions per image. Moreover, chip and off-chip memory can be used for different applications without being limited by the size of the image.

The chip also generates an embedded bitstream. The embedded bitstream is advantageous if, for example, the compression ratio is not suitable, whereby only fine details of the image are truncated.

The combination of lifting steps and row-by-row layered entropy coding further reduces memory utilization. By using Wavelets transforms having very small vertical regions of support, memory requirements are further reduced.

The staggering of block partitions for different subbands reduces memory utilization in block-coding applications. Exploiting wavelet factorization and local orientation features in the image allows excellent compression performance to be achieved without increasing memory requirements.

The use of block coding also improves compression performance without increasing the size of off-chip memory and without increasing the number of I/O transactions between the chip and the off-chip memory. Additionally, the block coding provides special capabilities such as region-of-interest decompression.

The invention is not limited to the host-printer and client-server applications described above. For example, the invention could be applied to satellite imagery. Additionally, the invention could be applied to applications that are compatible with the emerging JPEG-2000 standard.

The invention is not limited to the specific embodiments described and illustrated above. Instead, the invention is construed according to the claims that follow.

What is claimed is:

1. Apparatus for compressing an image, the image including K lines, where K is a positive integer, the apparatus comprising:
   means for providing a progression of overlapping N line windows of the image, where N is a positive integer, where 1<N<<K and where N is independent of K, the windows overlapping in a vertical direction; and
   a first stage of subband decomposition filters, the first stage including a vertical high pass filter and a vertical low pass filter;
   the first stage performing vertical high and low pass filtering on each N line window that is provided.

2. The apparatus of claim 1, wherein the providing means includes an image buffer for buffering the windows, each window retaining at least one line from a previous window.

3. The apparatus of claim 1, wherein N is about two times filter length.

4. The apparatus of claim 1, further comprising M additional cascaded stages of subband decomposition filters, each additional stage including a vertical high pass filter and a vertical low pass filter, each additional stage generating a plurality of subbands, each additional stage performing vertical high and low pass filtering on an N line window of a lowest subband generated by a previous stage.

5. The apparatus of claim 4, further comprising encoders for generating a bitstream from transform coefficients generated by the stages, the encoders
   generating bit-planes of the coefficients;
   decomposing the bit-planes into different subsequences;
   ordering the subsequences according to decreasing expected distortion reduction per expected bit of description;
   encoding the ordered subsequences; and
   placing the subsequences in the bitstream as ordered.

6. The apparatus of claim 4, further comprising encoders for generating a bitstream from transform coefficients generated by the stages, the encoders using a combination of quad tree decomposition and bit-plane coding.

7. The apparatus of claim 6, wherein the bitstream is generated by performing a quad tree decomposition on blocks of transform coefficients, whereby each block is split into a plurality of sub-blocks; identifying the sub-blocks that contain significant coefficients; bit-plane coding all sub-blocks containing significant coefficients; and performing an additional quad tree decomposition on the blocks having insignificant coefficients.

8. The apparatus of claim 1, wherein the first stage generates a plurality of subbands, each subband being generated S lines at a time, where S is a positive integer and S<N, one of the subbands being further decomposed, the other subbands being coded P lines at a time, where P is a positive integer and P>S.

9. The apparatus of claim 8, further comprising a plurality of entropy encoders, each entropy encoder corresponding to one of the other subbands, each encoder encoding its corresponding subband as soon as P lines of the corresponding subband become available.

10. The apparatus of claim 8, wherein each encoder encodes P lines of a subband as a plurality of blocks, the blocks being encoded independently of one another.

11. The apparatus of claim 10, wherein each block is coded by a combination of quad tree decomposition and bit-plane coding.

12. The apparatus of claim 11, wherein a given block is coded by the steps including:

performing a quad tree decomposition on the given block, whereby the given block is split into a plurality of sub-blocks;

bit plane coding the sub-blocks containing significant coefficients; and performing an additional quad tree decomposition on the sub-blocks containing insignificant coefficients.

13. The apparatus of claim 10, wherein a given block is coded by steps including quantizing the transform coefficients of the given block, generating bit-planes of the quantized coefficients; decomposing the bit-planes into different subsequences; ordering the subsequences according to decreasing expected distortion reduction per expected bit of description; encoding the ordered subsequences; and placing the subsequences in a bitstream as ordered.

14. The apparatus of claim 10, further comprising off-chip memory; wherein the first stage outputs a number T of subbands for immediate encoding, where T is a positive integer and T>1; and wherein the apparatus further comprises means for offsetting vertical boundaries of the subbands by P/T lines from one another, whereby subband blocks are staggered with respect to one another.

15. The apparatus of claim 1, wherein the first stage includes a vertical high pass filter for performing lifting steps on N lines of the image; horizontal high and low pass filters responsive to each first of the N lines; and a vertical low pass filter for performing lifting steps on outputs of the horizontal high and low pass filters.

16. The apparatus of claim 15, wherein the first and second vertical filters are rotatable to a plurality of specific orientations.

17. Data recorded in a storage medium, the data generated by the apparatus of claim 1.

18. Apparatus for processing a progression of N line windows of a digital image, the image including K lines, where K and N are positive integers, where 1<N<<K and where N is independent of K; the apparatus comprising a first stage of subband decomposition filters, the first stage including:

a vertical high pass filter and a vertical low pass filter for performing vertical high and low pass filtering on each N line window that is provided, wherein the vertical filters receive image lines having a first bit depth, wherein the vertical filters output lines having a second bit depth, the second bit depth being greater than the first bit depth;

a first pair of horizontal high and low pass filters responsive to an output of the vertical high pass filter; and a second pair of horizontal high and low pass filters responsive to an output of the vertical low pass filter.

19. A filter stage for performing subband decomposition of a K-line image, where K is a positive integer, the filter stage comprising:

a first filter for performing vertical lifting steps on each N line window of the image, where positive integer N<K;

a first pair of horizontal high and low pass filters responsive to a first of the N lines of each window;

a second pair of horizontal high and low pass filters responsive to an output of the vertical high pass filter; and a second filter for performing horizontal lifting steps on outputs of the first pair of horizontal high and low pass filters;

a first output of the filter stage providing a low pass subband; and a plurality of additional outputs of the filter stage providing high pass subbands;

wherein each window includes at least one line from a previous window.

20. The filter stage of claim 19, wherein the first and second lifting step filters are rotatable to a plurality of specific orientations.

21. The filter stage of claim 20, wherein the orientations include 0 degrees, ±23 degrees, and ±45 degrees.

22. The filter stage of claim 19, wherein the wherein the first and second lifting step filters perform the lifting steps as follows:

$H_n(i)=0.5[x_{2n+1}(i)-0.5(x_{2n}(i)+x_{2n+2}(i))]$; and $L_n(i)=x_{2n}(i)+0.5[H_{n-1}(i)+H_n(i)]$.

23. The filter stage of claim 19, wherein the first and second lifting step filters perform the lifting steps as follows:

$H_n(i)=0.5[x_{2n+1}(i)-P(x_{2n}, x_{2n+2})(i))]$; and $L_n(i)=x_{2n}(i)+0.5[H_{n-1}(i)+H_n(i)]$;

where P is an operator that exploits local orientation features of the image.

24. A method for performing subband decomposition of an image, the image including K lines, where K is a positive integer, the method comprising:

supplying a progression of N-line windows of the image, where N is a positive integer, where 1<N<<K and where N is independent of K;

using information from at least one previous window to perform vertical high pass filtering on each N-line window that has been supplied;

performing vertical low pass filtering on each N-line window that has been supplied; and repeating the supply and vertical filtering of the N-line windows until the entire image has been decomposed into a plurality of subbands.

25. The method apparatus of claim 24, wherein each window includes at least one line from a previous window.

26. The method of claim 24, wherein the vertical high pass filtering includes performing lifting steps on each N-line window; wherein the method further includes performing horizontal high and low pass filtering on the first line of each N-line window; and wherein the vertical low pass filtering includes performing lifting steps on results of the horizontal high and low pass filtering.

27. The method of claim 24, wherein the vertical filtering is performed at a plurality of specific orientations.

28. A storage medium encoded with data generated by the method of claim 24.

29. The method of claim 24, further comprising generating a bitstream from transform coefficients generated by the filtering, the transform coefficients coded by generating bit-planes of the coefficients;

decomposing the bit-planes into different subsequences;

ordering the subsequences according to decreasing expected distortion reduction per expected bit of description;

encoding the ordered subsequences; and placing the subsequences in the bitstream as ordered.

30. The method of claim 24, further comprising generating a bitstream by a combination of quad tree decomposition and bit-plane coding.

31. The method of claim 30, wherein the bitstream is generated by performing a quad tree decomposition on a block of transform coefficients, whereby the block is split into a plurality of sub-blocks; identifying the sub-blocks that contain significant coefficients; bit plane coding all sub-blocks containing significant coefficients; and performing an additional quad tree decomposition on the blocks having insignificant coefficients.

32. A chip for reconstructing an image from a subband decomposition, the image including K lines, where K is a positive integer, the subband decomposition including Q levels, where Q is a positive integer greater than one, each level including a plurality of subbands, the chip comprising:

inputs for receiving a plurality of N-line chunks for each subband of a given decomposition level; and a number Q of inverse filter stages, each inverse filter stage including inverse horizontal high and low pass filters operative on each chunk of N lines; first and second pairs of inverse vertical high and low pass filters, the first pair being responsive to an output of the horizontal high pass filter, the second pair being responsive to an output of the horizontal low pass filter; the first and second pairs of vertical filters outputting the reconstructed image by a plurality of lines at a time;

wherein the reconstruction of each lowest frequency subband is performed incrementally a few lines at a time by alternating vertical and horizontal filtering on a progression of overlapping N-line chunks of coefficients from other subbands.

33. A method for reconstructing an image from an embedded bitstream, the embedded bitstream representing a coded subband decomposition of the image, the image including K lines, where K is a positive integer, the subband decomposition including multiple decomposition levels, each level including a plurality of subbands, the method comprising the steps for a given decomposition level of:

decoding the embedded bitstream into a plurality of lines;

forming chunks of N lines for each of the subbands for a given decomposition level;

performing inverse horizontal filtering on each chunk of N lines; and performing inverse vertical filtering on the horizontally filtered chunks;

wherein the reconstruction of each lowest frequency subband is performed incrementally a few lines at a time by alternating the vertical and horizontal filtering on a progression of overlapping N-line chunks of coefficients from other subbands.

34. The method of claim 33, wherein the embedded bitstream is decoded into a plurality of blocks, the blocks being decoded independently of one another.

35. The method of claim 33, wherein the decoding includes performing reverse quad tree decomposition and bit-plane decoding.

36. The method of claim 33, wherein region of interest reconstruction of the image is performed, wherein different blocks of a subband represent different regions of the image.

37. The method of claim 33, wherein the inverse vertical filtering is rotated during image reconstruction.

38. The method of claim 37, wherein the inverse vertical filtering is rotated to orientations including 0 degrees, ±23 degrees, and ±45 degrees.

39. The method of claim 33, wherein the inverse vertical filtering is performed by reversing lifting steps.

40. The method of claim 39, wherein the lifting steps are performed as follows:

$$H_n(i)=0.5[x_{2n+1}(i)-0.5(x_{2n}(i)+x_{2n+2}(i))]; \text{ and}$$

$$L_n(i)=x_{2n}(i)+0.5[H_{n-1}(i)+H_n(i)].$$

41. The method of claim 37, wherein the lifting steps are performed as follows:

$$H_n(i)=0.5[x_{2n+1}(i)-P(x_{2n}, x_{2n+2})(i))]; \text{ and}$$

$$L_n(i)=x_{2n}(i)+0.5[H_{n-1}(i)+H_n(i)];$$

where P is an operator that exploits local orientation features of the image.

42. The method of claim 33, wherein block staggering is performed during the decoding.

43. The method of claim 33, wherein lines of the reconstructed image have a first bit depth, and wherein the chunks have a second bit depth, the second bit depth being greater than the first bit depth.

44. Apparatus for processing a progression of N line windows of a digital image, the image including K lines, where K and N are positive integers, where 1<N<<K and where N is independent of K; the apparatus comprising:

a first stage of subband decomposition filters, the first stage including a vertical high pass filter and a vertical low pass filter for performing vertical high and low pass filtering on each N line window that is provided, the vertical high pass and low pass filters performing lifting steps as follows:

$$H_n(i)=0.5[x_{2+1}(i)-0.5(x_{2n}(i)+x_{2n+2}(i))\ ]; \text{ and}$$

$$L_n(i)=x_{2n}(i)+0.5[H_{n-1}(i)+H_n(i)].$$

45. Apparatus for processing a progression of N line windows of a digital image, the image including K lines, where K and N are positive integers, where 1<N<<K, and where N is independent of K; the apparatus comprising:

a first stage of subband decomposition filters, the first stage including a vertical high pass filter and a vertical low pass filter for performing vertical high and low pass filtering on each N line window that is provided, the vertical high pass and low pass filters performing lifting steps as follows:

$$H_n(i)=0.5[x_{2n+1}(i)-P(x_{2n}, x_{2n+2})(i))]; \text{ and}$$

$$L_n(i)=x_{2n}(i)+0.5[H_{n-1}(i)+H_n(i)];$$

where P is an operator that exploits local orientation features of the image.

46. Apparatus for processing a progression of N line windows of a digital image, the image including K lines, where K and N are positive integers, where 1<N<<K, and where N is independent of K; the apparatus comprising:

a first stage of subband decomposition filters, the first stage including a vertical high pass filter and a vertical low pass filter for performing vertical high and low pass filtering on each N line window that is provided, the filters rotatable to orientations of 0 degrees, ±23 degrees, and ±45 degrees.

47. A method for performing subband decomposition of an image, the image including K lines, where K is a positive integer, the method comprising:

supplying a progression of N-line windows of the image, where N is a positive integer, where 1<N<<K and where N is independent of K;

performing vertical high pass filtering on each N-line window that has been supplied;

performing vertical low pass filtering on each N-line window that has been supplied; and repeating the supply and vertical filtering of the N-line windows until the entire image has been decomposed into a plurality of subbands wherein the window lines have a first bit depth, and wherein the vertical filtering produces lines having a second bit depth, the second bit depth being greater than the first bit depth.

48. A method for performing subband decomposition of an image, the image including K lines, where K is a positive integer, the method comprising:

supplying a progression of N-line windows of the image, where N is a positive integer, where $1<N<<K$ and where N is independent of K;

performing vertical high pass filtering on each N-line window that has been supplied; and performing vertical low pass filtering on each N-line window that has been supplied;

the lifting steps performed as follows:

$$H_n(i)=0.5[x_{2n+1}(i)-0.5(x_{2n}(i)+x_{2n+2}(i))]; \text{ and}$$

$$L_n(i)=x_{2n}(i)+0.5[H_{n-1}(i)+H_n(i)].$$

49. A method for performing subband decomposition of an image, the image including K lines, where K is a positive integer, the method comprising:

supplying a progression of N-line windows of the image, where N is a positive integer, where $1<N<<K$ and where N is independent of K;

performing vertical high pass filtering on each N-line window that has been supplied; and performing vertical low pass filtering on each N-line window that has been supplied;

the lifting steps performed as follows:

$$H_n(i)=0.5[x_{2n}(i)-P(x_{2n}, x_{2n+2}(i))]; \text{ and}$$

$$L_n(i)=x_{2n}(i)+0.5[H_{n-1}(i)+H_n(i)];$$

where P is an operator that exploits local orientation features of the image.

50. A method for performing subband decomposition of an image, the image including K lines, where K is a positive integer, the method comprising:

supplying a progression of N-line windows of the image, where N is a positive integer, where $1<N<<K$ and where N is independent of K;

performing vertical high pass filtering on each N-line window that has been supplied; and performing vertical low pass filtering on each N-line window that has been supplied;

the vertical filtering performed at orientations including 0 degrees, ±23 degrees, and ±45 degrees.

* * * * *